United States Patent
Simpson et al.

(10) Patent No.: US 7,689,731 B2
(45) Date of Patent: Mar. 30, 2010

(54) EXPOSING THE SUPPLY STATE OF A SHARED PERIPHERAL DEVICE TO A REMOTE NETWORK RESOURCE

(75) Inventors: Shell S. Simpson, Boise, ID (US); Mark A. Harper, Middleton, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 951 days.

(21) Appl. No.: 11/074,494

(22) Filed: Mar. 7, 2005

(65) Prior Publication Data

US 2006/0197971 A1    Sep. 7, 2006

(51) Int. Cl.
*G06F 3/00* (2006.01)
(52) U.S. Cl. .................................................... 710/19
(58) Field of Classification Search ............... 710/19
See application file for complete search history.

(56) References Cited

U.S. PATENT DOCUMENTS 5,828,864 A * 10/1998 Danknick et al. .............. 703/24
2005/0097198 A1 * 5/2005 Getler et al. ................. 709/223
2005/0275852 A1 * 12/2005 Ferlitsch ...................... 358/1.6
2006/0123151 A1 * 6/2006 Wurst et al. ................... 710/19

OTHER PUBLICATIONS

Leach, Paul J. et al. CIFS Printing Specification. Network Working Group (Internet Draft). Jan. 31, 1997. http://ftp.wayne.edu/pub/samba/specs/draft-leach-cifs-print-spec-00.txt (Accessed Feb. 14, 2005).
Sharpe, Richard. Just What Is SMB? Oct. 8, 2002. http://samba.anu.edu.au/cifs/docs/what-is-smb.html (Accessed Feb. 14, 2005).
Leach, Paul et al. CIFS: A Common Internet File System. Nov. 1996 http://www.microsoft.com/mind/1196/cifs.asp (Accessed Feb. 14, 2005).
CIFS Explained. CodeFx 2001. www.codefx.com.

* cited by examiner

*Primary Examiner*—Henry W. H. Tsai
*Assistant Examiner*—Kris Rhu

(57) ABSTRACT

Supply state information associated with a peripheral device that is shared over a network while coupled to a local network resource is obtained and a representation of the supply state information is stored in a data repository that is accessible by remote network resources.

19 Claims, 8 Drawing Sheets

EXPOSING THE SUPPLY STATE OF A SHARED PERIPHERAL DEVICE TO A REMOTE NETWORK RESOURCE

Computers and printers are often operatively coupled together in a network. These devices or resources may be referred to as "network computers" and "network printers". Such networked resources include the requisite hardware and/or software to effectively communicate with one another.

Some printers or other types of peripheral devices are not, however, equipped to connect directly to a network. These devices may instead be connected to local port of one of the network computers, which may then be configured to allow other network resources to share the device through the use of a share protocol or like capability typically provided in or added to the corresponding operating systems of the applicable network resources.

It is often desirable to obtain detailed supply state information from a peripheral device. Where, for example, a peripheral device is a printer, the supply state information may include current toner, ink, paper, or other like consumable supply level or other related information. While the locally connected network computer may be able to query and/or otherwise access the supply state information of the peripheral device through a local device driver or other like program, conventional share protocols do not allow other (e.g., remote) network computers to query and/or otherwise access such supply state information. It would be desirable to allow remote network computers to query and/or otherwise access the supply state information of a peripheral device that is connected locally to one of the network computers.

DESCRIPTION OF THE DRAWINGS

FIGS. 5-10 are exemplary flow diagrams illustrating methods for allowing network resources to learn and/or share the supply state information of a shared peripheral device, in accordance with certain embodiments of the present invention.

DETAILED DESCRIPTION

INTRODUCTION: Various embodiments described below operate to expose the supply state of a shared network peripheral device. The supply state of a peripheral device can be associated with the consumable supply status of the peripheral device. For example, where the peripheral device is a printer, the supply state of the printer can include information about the supply of toner or ink. A shared network peripheral device is a peripheral device that, while directly connected to a local port of a local network computer, can be utilized by remote network computers. Sharing is typically enabled through a share protocol of, or operatively associated with, an operating system. SMB/CIFS (Small Message Block/Common Internet File System) is an example of a share protocol that is utilized by the Microsoft® Windows® operating system to share files, directories, and printers.

Where for example, a shared peripheral device is a printer, a print job can be directed from a remote network computer to the shared printer according to a share protocol. The operating system for the local network computer receives and processes the print job passing it on to the shared printer via a local port. In this manner documents can be printed almost as if the shared printer were directly connected to a local port of the remote network computer.

A network computer is a computer that can interact with other computers over a computer network. The terms local and remote are used simply to distinguish the two network computers from one another. Examples of local ports that may be present on a network computer include USB (Universal Serial Bus) ports, serial ports, parallel ports, infrared, IEEE 1394, or other like data ports/interfaces.

The following description is broken into sections. The first section labeled "Environment" describes an exemplary network environment in which embodiments of the present invention may be implemented. The second section labeled "Components" describes exemplary physical and/or logical components of various embodiments of the present invention. The third section labeled "Operation" describes exemplary flow charts that illustrate steps taken to implement various embodiments of the present invention.

Figure 1:
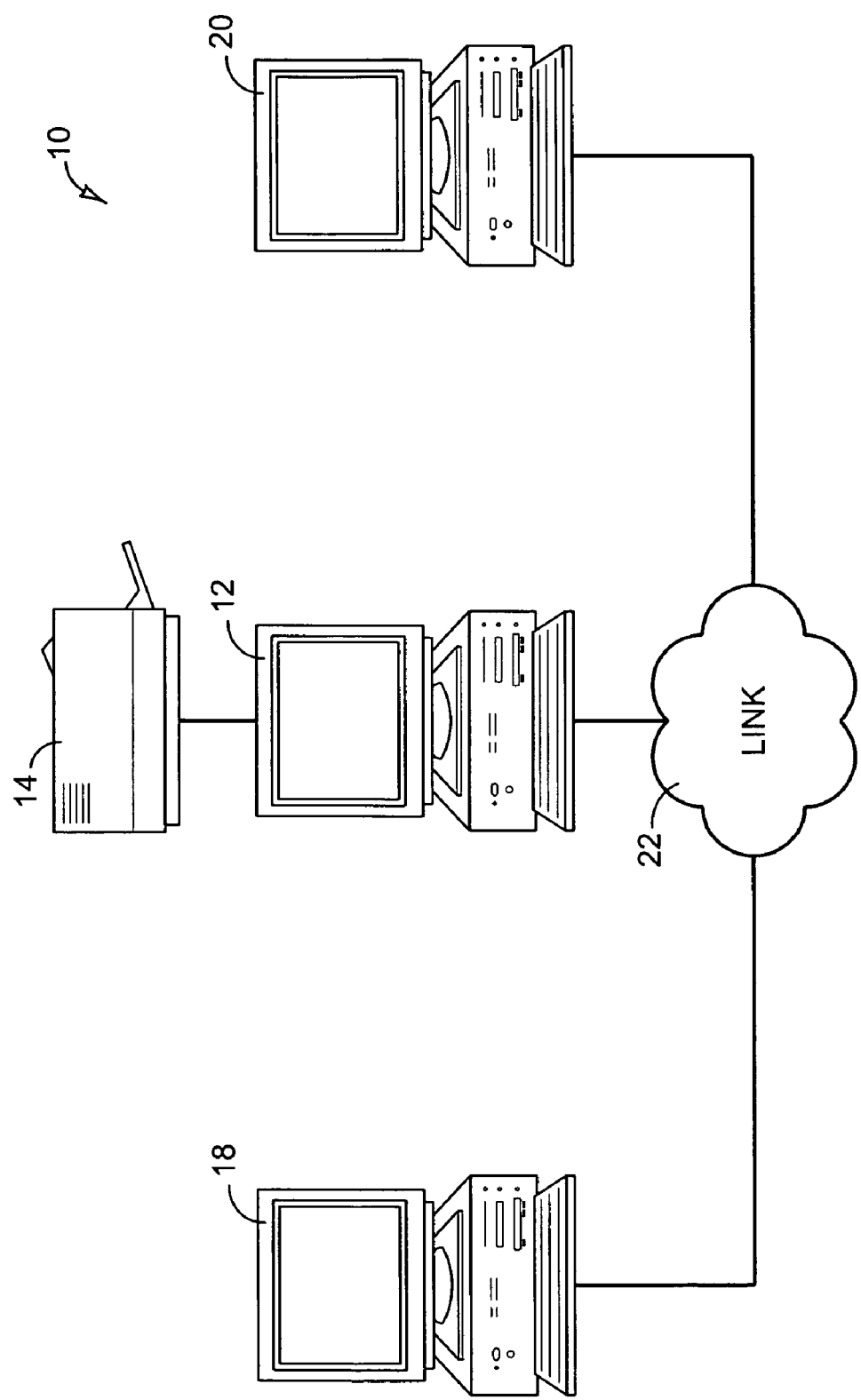
FIG. 1 is a schematic diagram of an exemplary network environment having a several network resources and a shared peripheral device in accordance with certain embodiments of the present invention.

ENVIRONMENT: FIG. 1 illustrates an exemplary environment in which embodiments of the present invention may be implemented. FIG. 1 is a schematic diagram of network 10 that includes local network computer 12 and shared peripheral device 14 shown as a printer. Shared peripheral device 14 is connected to a local port (see, for example, local port 26 in FIGS. 2 and 3) of local network computer 12.

Network 10 also includes remote network computers 18 and 20 as well as link 22. Link 22 represents generally one or more cable, wireless, or remote connections via one or more of a telecommunication link, an infrared link, a radio frequency link, and/or any other connector or system that provides electronic communication between network computers 12, 18, and 20. Link 22 may represent in whole or in part an intranet, the Internet, or a combination of both.

Utilizing a share protocol, an operating system for local network computer 12 is configured to allow access to shared peripheral device 14 with remote network computers 18 and 20. In this example, shared peripheral device 14 is a printer or other like printing device. Consequently, word processors or other applications running on remote network computers 18 and 20 can direct print jobs to shared peripheral device 14 via local network computer 12.

Figure 2:
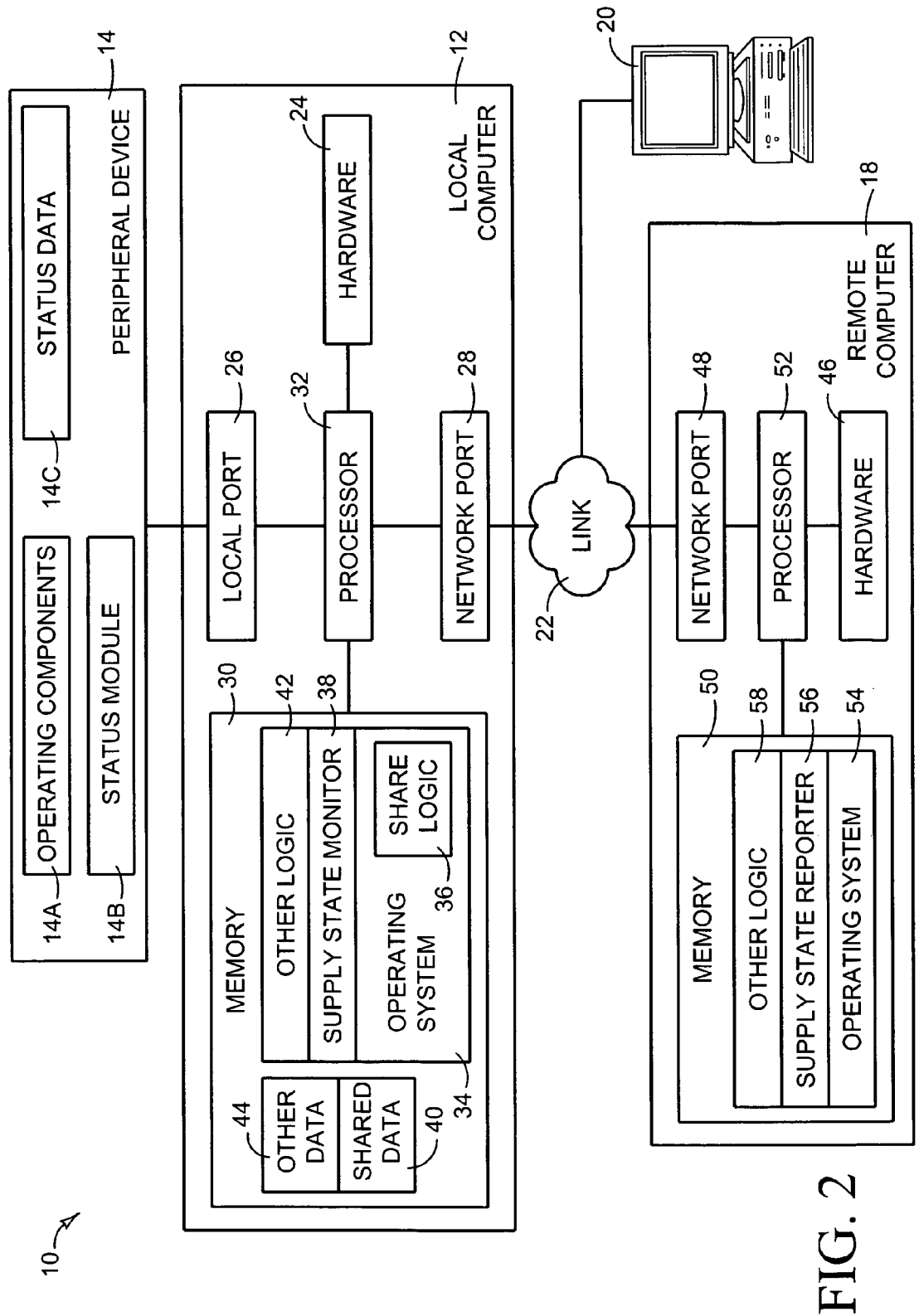
FIG. 2 is a block diagram showing network resources and a shared peripheral device in accordance with certain exemplary implementations of the present invention.

COMPONENTS: FIG. 2 is an exemplary block diagram illustrating physical and logical components of local network computer 12 and remote network computer 18 in network 10 In the example shown local network computer 12 includes hardware 24, local port 26, network port 28, memory 30, and processor 32. Hardware 24 represents the hardware, except for components 26-32, of local network computer 12. Examples of hardware 24 may include a video adapter and monitor, keyboard, pointing device, audio adapter and speakers. Local port 26 represents generally any local port that can be utilized to establish a connection (e.g., a direct connection) with shared peripheral device 14. For example, local port 26 may be a USB port, a serial port, a parallel port, an infrared port, Small Computer System Interface (SCSI) port, or an IEEE 1394 port. Network port 28 represents generally any port through which communication can be established with remote network computers 18 and 20. A common example is an Ethernet port.

Memory 30 represents generally any memory (volatile and/or non volatile) capable of storing program instructions and other electronic data. Memory 30, for example, can include a combination of memory devices such as RAM (Random Access Memory) and a hard disk drive. Processor 32 represents generally any processor capable of executing program instructions in memory 30.

As shown, memory 30 contains operating system 34 which includes share logic 36. Operating system 34 represents generally a software platform on top of which other programs can run. Operating system 34 is responsible for performing basic tasks, such as recognizing input from a keyboard, sending output to a monitor, keeping track of files and directories stored in memory 30, and utilizing drivers to guide or otherwise interact with peripheral devices such as shared peripheral device 14. Share logic 36 represents program instructions for sharing files, directories and peripherals with remote network computers 18 and 20. Where, for example, operating system 34 is Microsoft® Windows®, share logic 36 may utilize the SMB/CIFS share protocol. Utilizing share logic 36, operating system 34 can be configured to allow shared peripheral device 14 to be utilized by remote network computers 18 and 20.

Memory 30 also contains supply state monitor 38 and shared data 40. Shared data 40 represents a data repository that operating system 34 shares with remote network computers 18 and 20. Remote network computers 18 and 20 are able to access electronic files in shared data 40 as if those files were stored on remote network computers 18 and 20. Supply state monitor 38 represents program instructions for obtaining supply state information from shared peripheral device 14. Supply state information is any information regarding or related to the status of shared peripheral device 14. Supply state monitor 38 may, for example, use PML (Printer Management Language) to obtain supply state information. Supply state monitor 38 is also responsible for storing a representation of the supply state information in shared data 40 thereby exposing the supply state information to remote network computers 18 and 20. A representation of supply state information may be an electronic file containing data representing a supply state of the shared peripheral device.

Memory 30 is also shown to contain other logic 42 and other data 44. Other logic 42 represents any other program instructions not previously mentioned while other data represents all other files and directories not previously mentioned.

Shared peripheral device 14 is shown to include operating components 14A, status module 14B, and status data 14C. Operating components represent generally the hardware and programming for performing the primary tasks for which shared peripheral device 14 is designed. For example, where shared peripheral device 14 is a printer, operating components 14A will include a print engine capable of forming a desired image on a page according to instructions received from local network computer 12, a memory containing program instructions for controlling the print engine, a processor for executing those instructions, and a device port for connecting to local network computer 12.

Status module 14B represents generally any combination of programming and/or hardware capable of monitoring the status of operating module 14A. Status module 14B is responsible for reporting on the supply state of shared peripheral device 14. Operating components 14A may include or otherwise hold or contain consumable material such as toner or ink, paper, and binding materials such as staples or glue. The supply state of shared peripheral then includes data reflecting the supply levels of those consumables.

Status module 14B may store information concerning the supply state of shared peripheral device 14 as status data 14C. Status module 14B may be configured to interact with supply state monitor 38 and to gather and return supply state information as requested. For example, state module 14B may be capable us responding to PML (Printer Management Language) requests to provide supply state information to supply state monitor 38 of network computer 12.

Remote network computer 18 includes hardware 46, network port 48, memory 50, and processor 52. Hardware 46 represents the hardware, except for components 48-52, of remote network computer 18. Examples of hardware 46 may include a video adapter and monitor, keyboard, pointing device, audio adapter and speakers. Network port 48 represents generally any port through which communication can be established with local network computer 12. A common example is an Ethernet port.

Memory 50 represents generally any memory (volatile and/or non volatile) capable of storing program instructions and other electronic data.

Memory 50, for example, can include a combination of memory devices such as RAM (Random Access Memory) and a hard disk drive. Processor 52 represents generally any processor capable of executing program instructions in memory 50.

As shown, memory 50 contains operating system 54. Operating system 54 represents generally a software platform on top of which other programs can run. Operating system 54 is responsible for performing basic tasks, such as recognizing input from a keyboard, sending output to a monitor, keeping track of files and directories stored in memory 50, and, through the use of device drivers, providing instructions for controlling or otherwise interacting with peripheral devices such as shared peripheral device 14. For example, where shared peripheral device 14 is a printer, operating system 54 may use a corresponding printer driver to send a print job to shared peripheral device 14. In turn, shared peripheral device 14 interprets the print job and produces a printed document.

Memory 50 also contains supply state reporter 56 and other logic 58. Supply state reporter 56 represents program instructions for obtaining a representation of supply state information for shared peripheral device 14 stored in shared data 40 of local network computer 12. Supply state reporter 56 is also responsible for presenting the representation of the supply state information in a user interface such as a pop-up window, web page, or the like.

Other logic 58 represents any other program instructions not previously mentioned. While not shown in FIG. 2, remote network computer 20 may include the same components as remote network computer 18.

Figure 3:
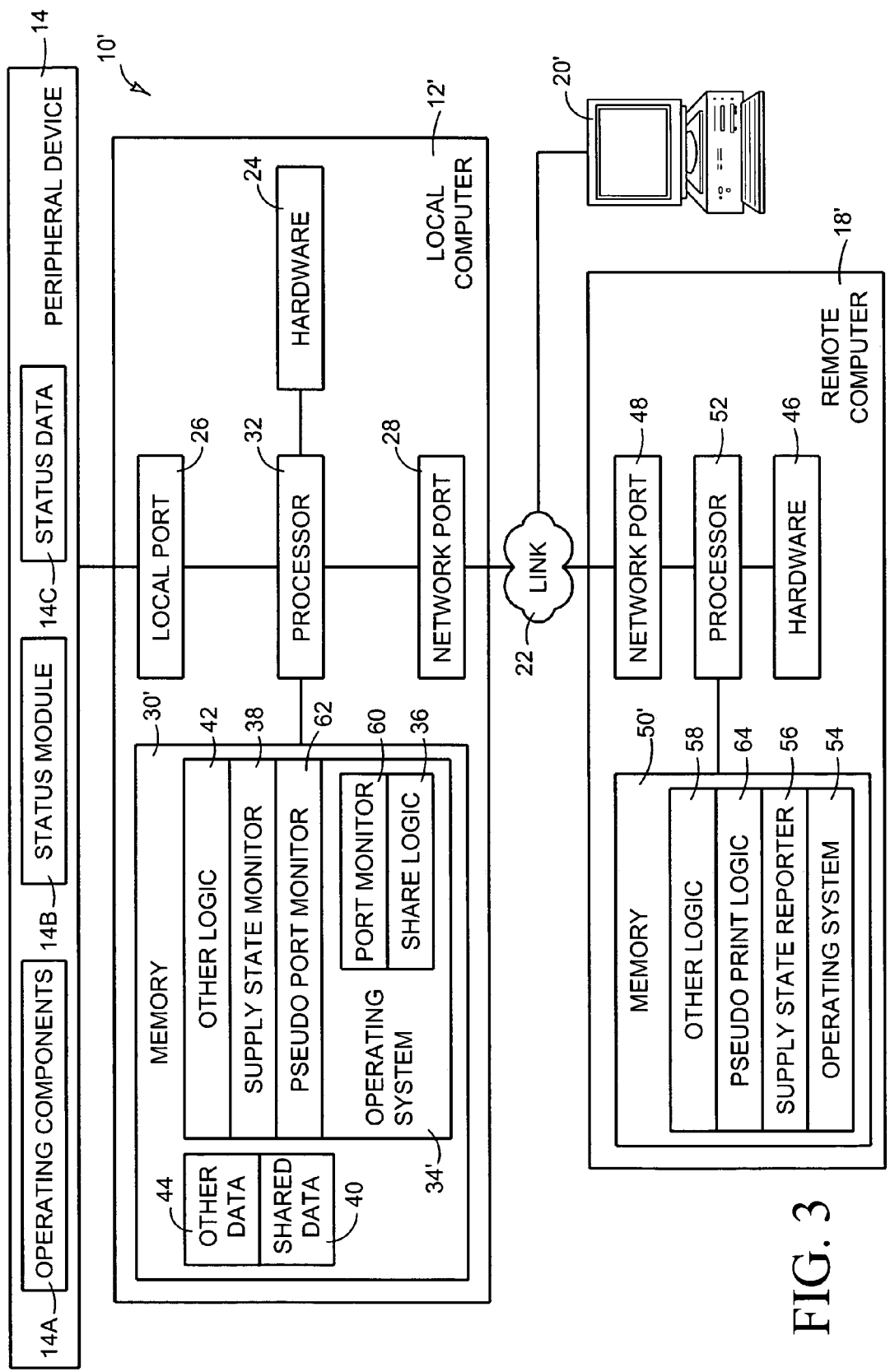
FIG. 3 is a block diagram showing network resources and a shared peripheral device in accordance with certain other exemplary implementations of the present invention.

FIG. 3 is an exemplary block diagram illustrating physical and logical components of a local network computer 12' and remote network computer 18' in a network 10'. In the example shown, local network computer 12' includes hardware 24, local port 26, network port 28, memory 30', and processor 32.

Memory 30' represents generally any memory (volatile and/or non volatile) capable of storing program instructions and other electronic data.

Memory 30', for example, can include a combination of memory devices such as RAM (Random Access Memory) and a hard disk drive. Processor 32' represents generally any processor capable of executing program instructions in memory 30'.

As shown, memory 30' contains operating system 34' which includes share logic 36' and port monitor 60. Port monitor 60 represents program instructions for controlling local port 26. Port monitor 60 is responsible for sending print jobs to shared peripheral device 14 via local port 26. Memory 30' also contains supply state monitor 38, shared data 40, and pseudo port monitor 62.

Pseudo port monitor 62 represents program instructions for intercepting a print job directed to shared peripheral device 14 and determining if the print job is a pseudo print job. A pseudo print job is a request to obtain supply state information that is masked as an otherwise regular print job. In other words, except for a flag or other indicator, a pseudo print job appears to be a normal print job. Upon a determination that a print job is a pseudo print job, pseudo port monitor 62 directs supply state monitor 38 to perform its intended function. That is, pseudo print monitor 62 instructs supply state monitor 38 to obtain supply state information and to store a representation of that supply state information in shared data 40. Otherwise, pseudo port monitor 62 passes the print job on to port monitor 60 so that the print job can be processed accordingly.

Generally speaking, a print job includes print data and a series of electronic instructions directing a printer, such as shared peripheral device 14, to produce images representing the print data on one or more media sheets. A print job typically conforms to a particular standard depending upon the control language in which it was generated. Postscript and PCL (Page control language) are exemplary standards.

Because a pseudo print job is intercepted by pseudo port monitor 62 and need not be passed on to shared peripheral device 14, the format of the pseudo print job need not conform to a particular set of rules. That is, the addition of the indicator identifying the pseudo print job as a pseudo print job may or may not render incapable of being printed. A pseudo print job need only contain data serving as an indicator recognizable by pseudo port monitor 62. For example, a pseudo print job may simply contain an instruction or instructions recognized by pseudo port monitor 62 as a request for status information. Pseudo port monitor 62 then continually monitors print jobs and identifies a pseudo print jobs by recognizing such instructions.

As shown, memory 50' contains operating system 54, pseudo print logic 64, supply state reporter 56 and other logic 58. Pseudo print logic 64 represents program instructions for directing a pseudo print job to shared peripheral device 14. As described above, a pseudo print job is an otherwise normal print job that includes a flag or other indicator that signifies that it is a request for supply state information and not to be treated a normal print job. Although the pseudo print job is "normal" in the sense that it is submitted in the same manner as a "normal" print job, it is not normal in the sense that it is not intended to be printed. Pseudo print logic 64 may include an identifier in the pseudo print job; the identifier to be included, for example, in the representation of the supply state information stored in shared data 40'. The identifier can then be used to identify the representation of the supply state information as supply state information stored in shared data 40 following a particular pseudo print job. For example, the representation of the supply state information may be stored using a file name or subdirectory name containing the identifier. Alternatively, the identifier may be an alphanumeric string contained within the representation of the supply state information. By searching for the identifier in file names, directory names or file contents within shared data 40, the representation of the supply state information can be located.

Figure 4:
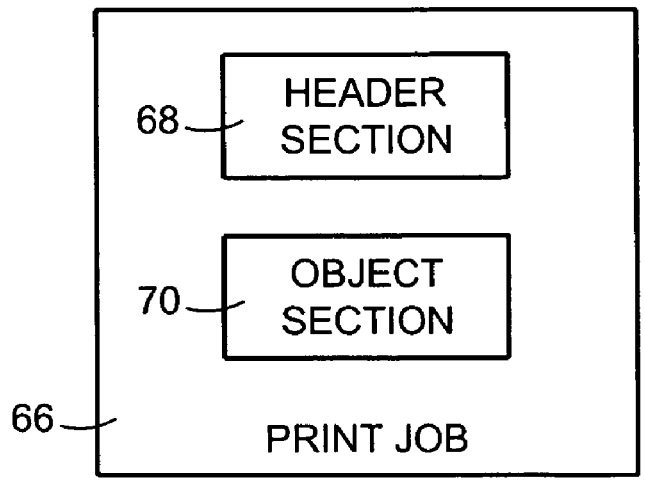
FIG. 4 is an exemplary block diagram of a print job.

FIG. 4 provides a block diagram of an exemplary print job 66. Print job 66 includes a header section 68 and an object section 70. Header section 68 can include, among other data, administrative information such as the file name of the file being printed, the identity of the computer from which it originated, a timestamp, and the application that generated the print job.

The following is an example of header section 68 data from a sample PJL (Printer Job Language) print job.

```
@PJL SET STRINGCODESET=UTF8
@PJL COMMENT "HP LaserJet 2300 Series PS (60.5.30.1);
Microsoft Windows XP 5.1.2600.1; PScript 0.3.1282.1"
@PJL COMMENT "Username: DEFAULT_USER; App
Filename: Sample - Notepad; 1-31-2005"
@PJL SET JOBATTR="JobAcct1=DEFAULT"
@PJL SET JOBATTR="JobAcct2=DEFAULTN800WXP"
@PJL SET JOBATTR="JobAcct3=AMERICAS"
@PJL SET JOBATTR="JobAcct4=20050131111811"
@PJL DMINFO
ASCIIHEX="0400040101020D1010011532303035303133313
13831383131"
@PJL SET USERNAME="DEFAULT_USER"
@PJL SET RET=MEDIUM
@PJL SET RESOLUTION=600
@PJL SET BITSPERPIXEL=2
@PJL SET ECONOMODE=OFF
@PJL ENTER LANGUAGE=POSTSCRIPT
%%Creator: PScript5.dll Version 5.2
%%CreationDate: 1/31/2005 11:18:11
%%For: default_user
%%BoundingBox: (atend)
%%Pages: (atend)
%%Orientation: Portrait
%%PageOrder: Special
%%DocumentNeededResources: (atend)
%%DocumentSuppliedResources: (atend)
%%DocumentData: Clean7Bit
%%TargetDevice: (HP LaserJet 2300) (3010.107) 0
%%LanguageLevel: 3
%%EndComments
```

Object section 70 includes the print data and the instructions for processing the print data to form a desired image. For example, the print data may be a raster image and the instructions for processing may dictate the placement of the raster image on a page. As noted above, a print job may be expressed in PJL (Printer Job Language) and referred to as a PJL document. Contained within that PJL document are a number of PJL commands which provide information to the printer. One of the PJL commands tells the printer to process print data in a particular format. The print data is processed until an "exit" sequence in the print data is encountered. This causes the printer to resume processing other PJL commands, if any.

Print job 66 may be a pseudo print job. In such a case it will include an indicator reflecting its nature as a pseudo print job and may include an identifier to be used to distinguish a representation of the supply state information as being generated in response to the pseudo print job. As noted above the indicator need only be information that can be interpreted by pseudo port monitor 62 to identify print job 66 as a pseudo print job. The indicator may be found in header section 68. For example, header section 68 may include data indicating that print job 66 originated from a specific but fictitious source. The indicator may instead be found in object section 70. The indicator may be a pseudo PJL command that indicates that the pseudo print job is to be treated simply as a request to status information. Because the pseudo print job need never reach the printer, the pseudo PJL command need not be recognizable by the printer—only pseudo port monitor 62.

The identifier may simply be any data in header section 68 that distinguished the pseudo print job from other print jobs.

The identifier may simply be the data identifying a document, in this case a pseudo document, being printed. It may include data identifying the source of print job 66. It may even include a combination of such data and any other unique data that might be found in header section 68.

Figure 5:
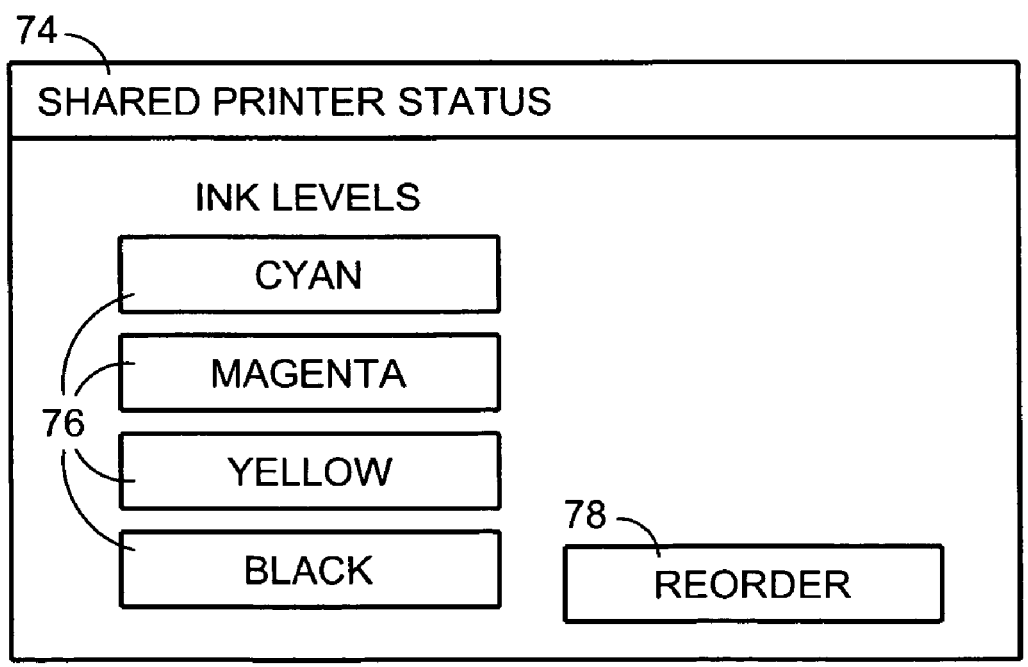
FIG. 5 is an exemplary screen display of a network resource presenting supply state information to a user, according to an embodiment of the present invention.

FIG. 5 is an exemplary screen view of a user interface 74 (displayed by a remote network computer) presenting a representation of supply state information for a shared printer. Here, the supply state information includes toner or ink levels represented by level indicators 76. User interface 74 also includes a reorder button 78 serving, for example, as a link to a web site for ordering ink or toner. In the example of FIG. 4, supply state information for toner or ink levels is obtained from a shared printer. A representation of that supply state information is stored in a data repository, such as memory 30/30', shared over the network. The stored information is later retrieved and presented in user interface 74.

Figure 6:
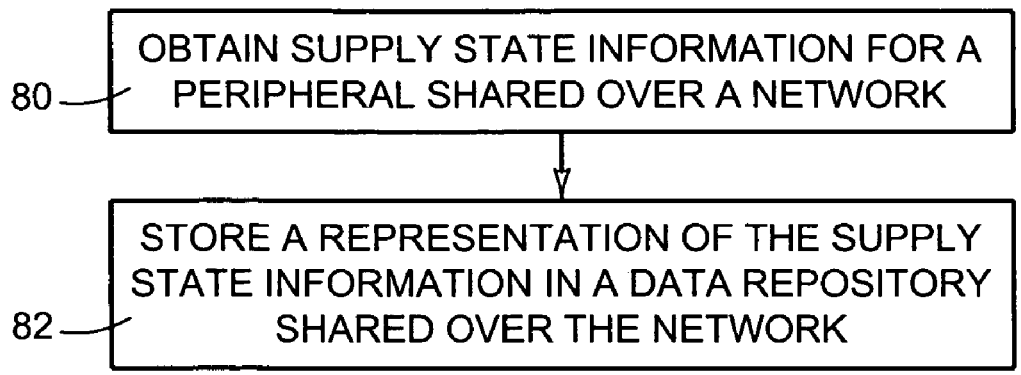

OPERATION: The operation of certain exemplary embodiments will now be described with reference to FIGS. 6-10. FIG. 6 is an exemplary flow diagram illustrating a method for updating supply state information. Supply state information is requested/obtained for a peripheral device shared over a network in step 80. Step 80, for example, can include obtaining the current toner or ink levels for a shared printer. A representation of the obtained supply state information is then stored in a data repository shared over the network per step 82. Step 82, for example, can include storing a representation of the supply state information for a shared printer in the same shared directory used to store temporary spool files when remote network computers direct prints jobs to shared the shared printer.

The peripheral device and the data repository are shared according to a share protocol. In this manner, the stored representation of the supply state information can be exposed to those remote network computers which are able to retrieve the representation as desired.

Figure 7:
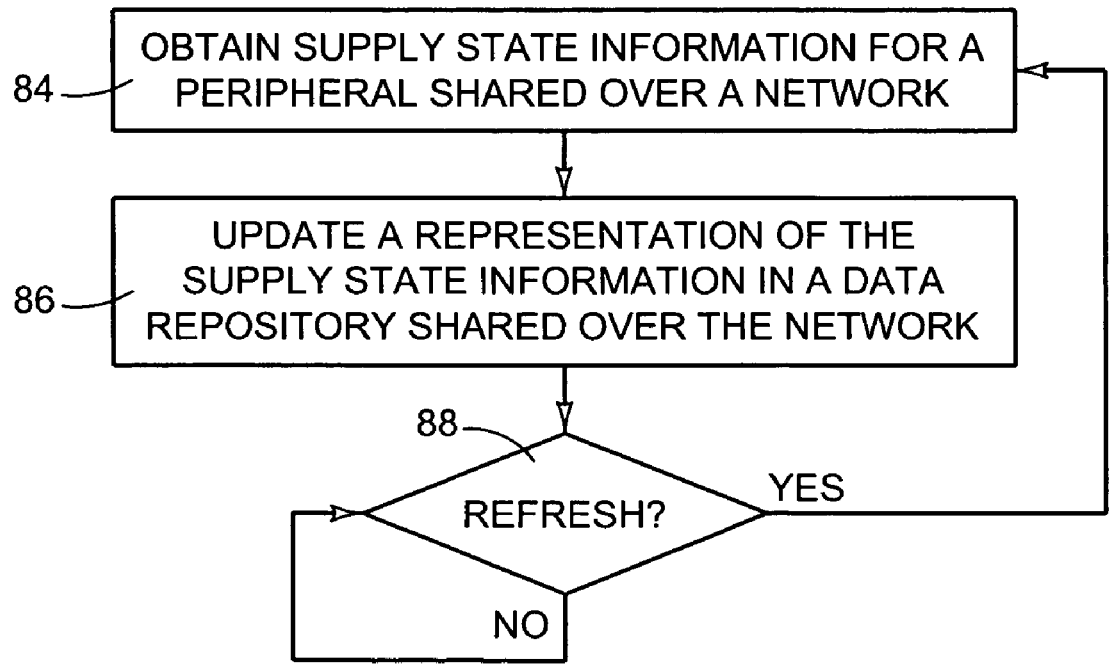

FIG. 7 is an exemplary flow diagram illustrating a method for periodically updating supply state information. Supply state information is obtained/requested for a peripheral device shared over a network in step 84. A representation of the obtained supply state information is then stored in a data repository shared over the network in step 86. It is then determined in step 88 if a refresh period has lapsed. In this example, the refresh period is a set time between successive attempts to obtain the supply state information. Upon a determination that the refresh period has lapsed, the process repeats with step 84. In this manner, the representation of the supply state information can be periodically updated.

Figure 8:
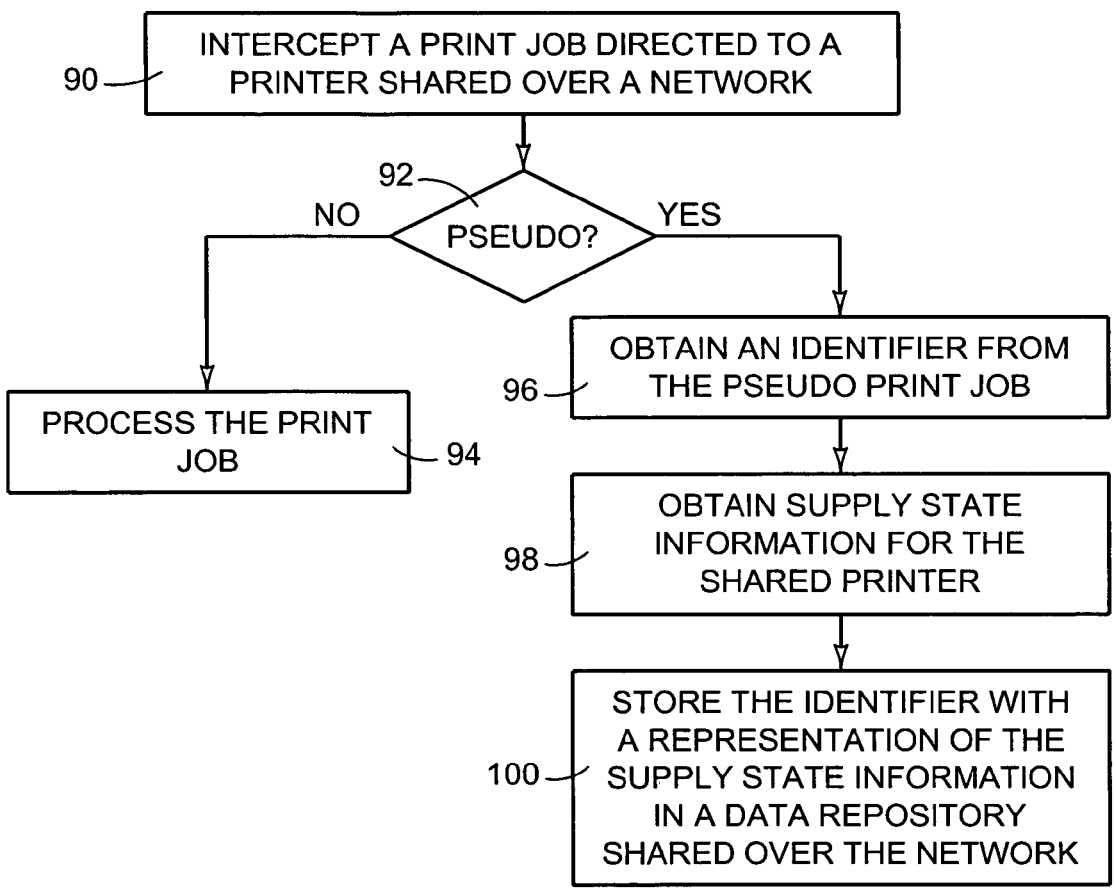

FIG. 8 is an exemplary flow diagram illustrating a method for selectively updating supply state information. Here, a print job directed to a printer shared over a network is intercepted step 90. Step 90, for example, can include intercepting a print job sent from a remote network computer to a printer shared by a local network computer. It is determined in step 84 if the print job is a pseudo print job. As described above, a pseudo print job is a request to obtain supply state information that is masked as an otherwise regular print job. If it is not a pseudo print job, then in step 94 the print job is processed in a normal fashion. Otherwise, in step 96 an identifier is obtained from the pseudo print job.

In step 98, supply state information is obtained for the shared printer. The identifier is stored with a representation of the obtained supply state information in a data repository shared over the network in step 100. With respect to step 100, the data representing the supply state information may be stored using a file name or subdirectory name that includes the identifier. Alternatively, the data representing the supply state information may be stored so that it includes the identifier. In this manner, the supply state information is exposed to remote network computers. A remote network computer can access the shared data repository and use the identifier to obtain the representation of the supply state information. In an alternative embodiment, step 84 may be eliminated in which case steps 94-100 are performed upon receipt of every print job directed to the shared printer.

Figure 9:
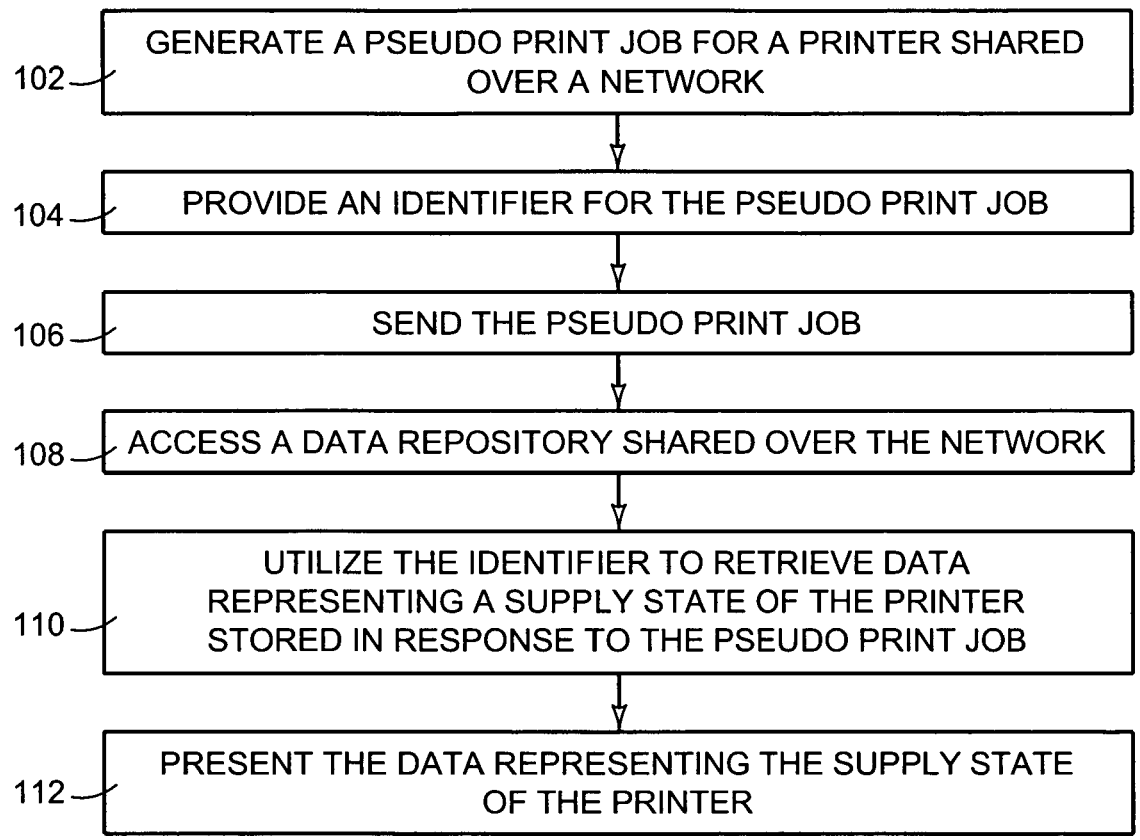

FIG. 9 is an exemplary flow diagram illustrating a method for obtaining a representation of supply state information stored in response to a pseudo print job. Here, the shared peripheral device is a printer or other like printing device. A pseudo print job is generated for a printer shared over a network in step 102. An identifier is provided for the pseudo print job in step 104. The pseudo print job is sent to the printer via a local network computer in step 106. A data repository shared over the network is subsequently accessed in step 108. The identifier can be utilized to retrieve data representing a supply state of the shared printer stored in response to the pseudo print job per step 110. With respect to step 110, the data representing the supply state information may be stored using a file name or subdirectory name that includes the identifier. Alternatively, the data representing the supply state information may be stored so that it includes the identifier. Step 110 can then involve searching for a file or directory that includes the identifier or scanning the contents of files searching for the identifier. Data representing the supply state of the printer is then presented in step 112 by the remote network computer to the user. As described above, the data can be presented as a user interface displayed in a pop-up window, web page, or any other suitable manner.

Figure 10:
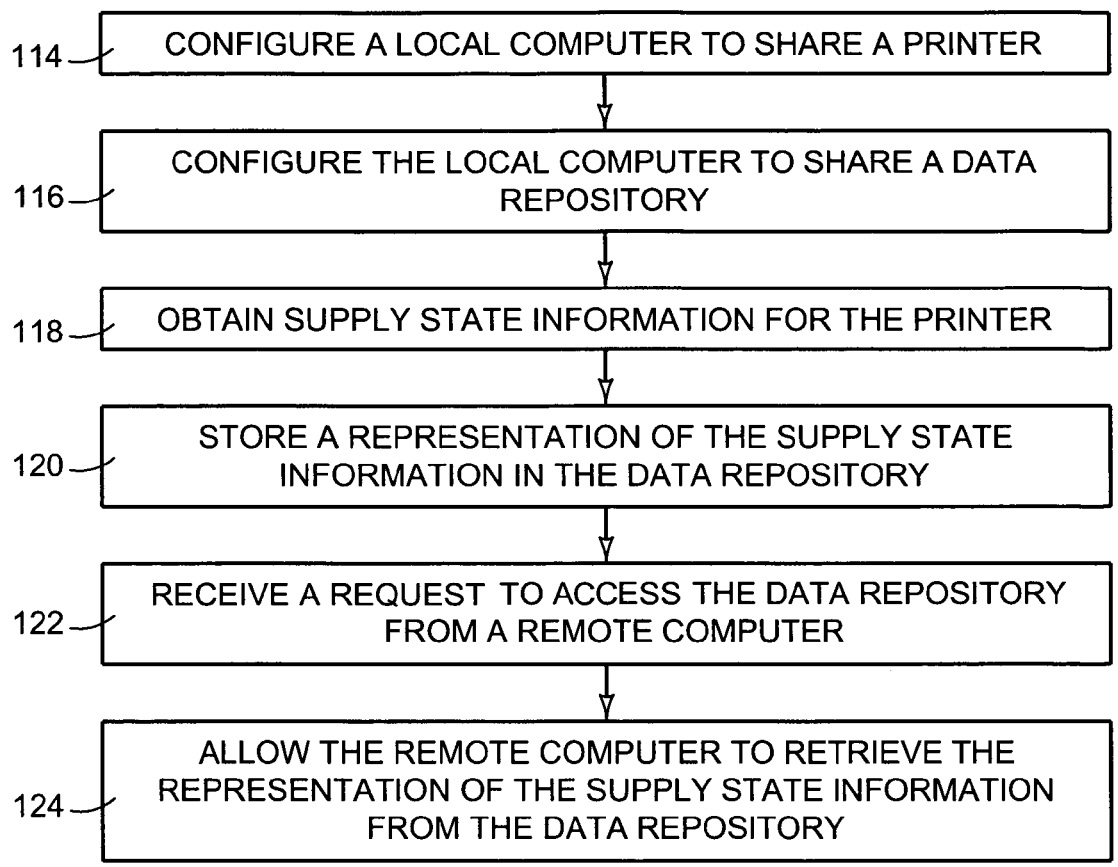

FIG. 10 is an exemplary flow diagram illustrating a method for exposing supply state information to a remote network computer utilizing the SMB/CIFS share protocol. A local network computer directly connected to a printer is configured to share the printer over a network in step 114. In doing so, the local network computer is configured to share a data repository in step 116. Microsoft Windows® refers to this data repository (sometimes referred to as a file share) as "print$". The data repository can be located using a tree identifier that identifies the data repository as a file or folder in a directory structure. For example, the tree identifier may take the form of "host/path/name" where "host" identifies the local network computer, "path" represent a root directory, and "name" represents the data repository. The local network computer can then store one or more printer driver files for the printer in the data repository. The data repository provides remote network computers with access to the printer driver files and any other information that might be contained therein. It also provides a location for queuing a print job directed from a remote network computer to the printer.

Remote network computers wishing to use the printer can then initiate the Windows® "Add Printer Wizard" to access the data repository and then retrieve and install the appropriate driver. Using a standard "Open_Print_File" SMB/CIFS command, a remote network computer can then direct a print job to the printer. The command includes a tree identifier for a print queue for a particular printer, the print queue being part of the data repository. That print job is then written to the data repository, queued, spooled to the identified printer, and then automatically deleted.

The local network computer, using a well known protocol such as PML (Printer Management Language) obtains supply state information from the printer in step 118. The local network computer then exposes the supply state information to a remote network computer by storing a representation of the supply state information in the data repository in step 120.

The local network computer receives a request from the remote network computer to access the data repository in step 122 and allows the remote network computer to retrieve the representation of the supply state information from the data repository in step 124. Once retrieved, the remote network computer presents the representation of the supply state information within a user interface.

With respect to step 122, the identity (tree identifier) of the data repository is known or can be identified by a remote network computer. The remote computer, using standard SMBtcon (Tree Connect) SMB/CIFS command can establish a connection with the data repository. Using a standard SMBopen or SMBcopy SMB/CIFS command, the remote computer can retrieve the representation of the supply state information.

CONCLUSION: The schematic diagram of FIG. 1 illustrates an exemplary environment in which embodiments of the present invention may be implemented. Implementation, however, is not limited to this environment. The block diagrams of FIGS. 2 and 3 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

The exemplary user interface of FIG. 5 is just that exemplary. Other suitable interface configurations including programmatic interfaces may be substituted to achieve the desired results.

Although the flow diagrams of FIGS. 6-10 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for exposing a supply state of a printing device over a network to a remote network resource, the method comprising: with a local network resource operatively coupled to the printing device, configuring the local network resource to share the printing device with the remote network resource according to a share protocol, the share protocol not allowing the remote network resource to directly query or otherwise access the supply state from the printing device; the local network resource determining if a print job directed to the printing device is a pseudo print job, the pseudo print job being a request to obtain supply state information that is masked as an otherwise regular print job; and if the print job is identified as a pseudo print job, obtaining, at the local network resource, supply state information from the printing device and storing a representation of the supply state information in a data repository that is accessible to the remote network resource according to the share protocol; and if the print job is not a pseudo print job, processing the print job so that it is printed by the printing device.

2. The method of claim 1, further comprising periodically repeating the acts of obtaining and storing the representation of the supply state information.

3. The method of claim 1, wherein the act of storing includes storing the representation of the supply state information with an identifier obtained from the pseudo print job.

4. The method of claim 3, further comprising obtaining the identifier from the pseudo print job.

5. The method of claim 3, further comprising with the remote network resource, retrieving the representation of the supply state information from the data repository using at least the identifier.

6. The method of claim 1, further comprising identifying the print job as a pseudo print job based on the presence of at least one indicator within the print job.

7. The method of claim 1, further comprising, with the remote network resource, retrieving the representation of the supply state information from the data repository.

8. The method of claim 1, further comprising:
configuring the local network resource to share the data repository with the remote network resource according to the share protocol.

9. The method of claim 8, further comprising:
receiving from the remote network resource, a request to access the data repository, the request being sent according to the share protocol; and
allowing, according to the share protocol, the remote network resource to retrieve the representation of the supply state information from the data repository.

10. A computer readable medium having instructions for causing a local network resource to:
share a printing device with a remote network resource according to a share protocol, the share protocol not allowing the remote network resource to directly query or otherwise access a supply state from the printing device;
determine if a print job directed to the printing device is a pseudo print job, the pseudo print job being and a request to obtain supply state information that is masked as an otherwise regular print job; and
if the print job is identified as a pseudo print job, obtain, at the local network resource, supply state information from the printing device and store a representation of the supply state information in a data repository that is accessible to the remote network resource according to the share protocol; and
if the print job is not a pseudo print job, process the print job so that it is printed by the printing device.

11. The medium of claim 10, wherein the instructions cause the local network resource to store the representation of the obtained supply state information with at least one identifier in a data repository shared over the network, the identifier being associated with the pseudo print job.

12. The medium of claim 10, having further instructions for causing the local network resource to:
- receive from the remote network resource, a request to access the data repository, the request being sent according to the share protocol; and
- allow, according to the share protocol, the remote network resource to retrieve the representation of the supply state information from the data repository.

13. A system comprising:
- a printing device; and
- a local network resource operatively coupled to the printing device through a local port and to a network link through another port, the local network resource comprising a processor and a memory, the memory including a data processor and logic, the logic when executed by the processor being operable to:
  - share, according to a share protocol, the peripheral and to share the data repository with a remote network resource;
  - determine if a print job directed to the printing device is a pseudo print job, the pseudo print job being and a request to obtain supply state information that is masked as an otherwise regular print job; and
  - if the print job is identified as a pseudo print job, obtain supply state information from the printing device and store a representation of the supply state information in the data repository that is accessible to the remote network resource according to a share protocol; and
  - if the print job is not a pseudo print job, processing the print job so that it is printed by the printing device.

14. The system of claim 13, wherein the logic, when executed, is configured to store the representation of the supply state information with an identifier.

15. The system of claim 14, wherein the logic, when executed, is configured to at least partially obtain the identifier from the pseudo print job.

16. The system of claim 14, wherein the remote network resource is configured to access the supply state information from the data repository using the identifier.

17. The system of claim 13, wherein the logic, when executed, is further configured to identify the pseudo print job based on the presence of at least one indicator within the pseudo print job.

18. The system of claim 13, wherein at least one of the local network resource and remote network resource includes a computer.

19. The system of claim 13, wherein the logic, when executed, is configured to receive from the remote network resource, a request to access the data repository, the request conforming to the share protocol, and to allow, according to the share protocol, the remote network resource to retrieve the representation of the supply state information from the data repository.

* * * * *

UNITED STATES PATENT AND TRADEMARK OFFICE
CERTIFICATE OF CORRECTION

PATENT NO. : 7,689,731 B2
APPLICATION NO. : 11/074494
DATED : March 30, 2010
INVENTOR(S) : Shell S. Simpson et al.

It is certified that error appears in the above-identified patent and that said Letters Patent is hereby corrected as shown below:

In column 10, line 23, in Claim 5, after "comprising" insert -- , --.

Signed and Sealed this

Thirteenth Day of July, 2010

David J. Kappos
*Director of the United States Patent and Trademark Office*